United States Patent [19]

Svensson et al.

[11] Patent Number: 5,209,594
[45] Date of Patent: May 11, 1993

[54] ARRANGEMENT FOR LOCKING A SHAFT TO A MACHINE MEMBER

[76] Inventors: Roger Svensson, Bondegatan 8B; Evert Svensson, Malmvägen 1D, both of Atvidaberg, Sweden, S-59700

[21] Appl. No.: 773,598
[22] PCT Filed: May 29, 1990
[86] PCT No.: PCT/SE90/00360
§ 371 Date: Nov. 19, 1991
§ 102(e) Date: Nov. 19, 1991
[87] PCT Pub. No.: WO90/15262
PCT Pub. Date: Dec. 13, 1990

[30] Foreign Application Priority Data

May 31, 1989 [SE] Sweden ............................ 8901956

[51] Int. Cl.$^5$ ............................................. B25G 3/00
[52] U.S. Cl. ...................................... 403/11; 403/150; 403/156; 403/162
[58] Field of Search ................. 403/11, 150, 151, 156, 403/161, 162, 371

[56] References Cited

U.S. PATENT DOCUMENTS

| 1,231,745 | 7/1917 | Kenney | 403/156 |
| 1,472,565 | 10/1923 | Manning | 403/370 X |
| 3,129,966 | 4/1964 | Blank | 403/156 |
| 4,634,299 | 1/1987 | Svensson | 403/371 X |

FOREIGN PATENT DOCUMENTS

| 202730 | 10/1908 | Fed. Rep. of Germany. |
| 3444608 | 5/1987 | Fed. Rep. of Germany. |
| 435953 | 10/1984 | Sweden. |

Primary Examiner—Andrew V. Kundrat
Attorney, Agent, or Firm—Beveridge, DeGrandi, Weilacher & Young

[57] ABSTRACT

An arrangement for locking a shaft or an axle to a machine member. The shaft has a cylindrical part which is intended to carry a bearing. The arrangement includes two expander sleeves which have a control internal shape and each of which is intended to be mounted on a respective end of the shaft of similar conical shape. The expander sleeves function as annular wedges with the apex of the wedge facing towards the cylindrical part of the shaft or axle and when tightening a nut are caused to expand against the machine member and lock the shaft. The shaft comprises an outer sleeve which faces the conically shaped end-parts, and a pin which is arranged coaxially with and within the sleeve and one end of which has an outwardly curved, mushroom-headed end-part whose radially inward surface is intended to abut an adjacent second expander sleeve, and the other end of which pin carries the nut with which the first and second expander sleeves are caused to expand into clamping contact with the machine member when tightening the nut.

13 Claims, 1 Drawing Sheet

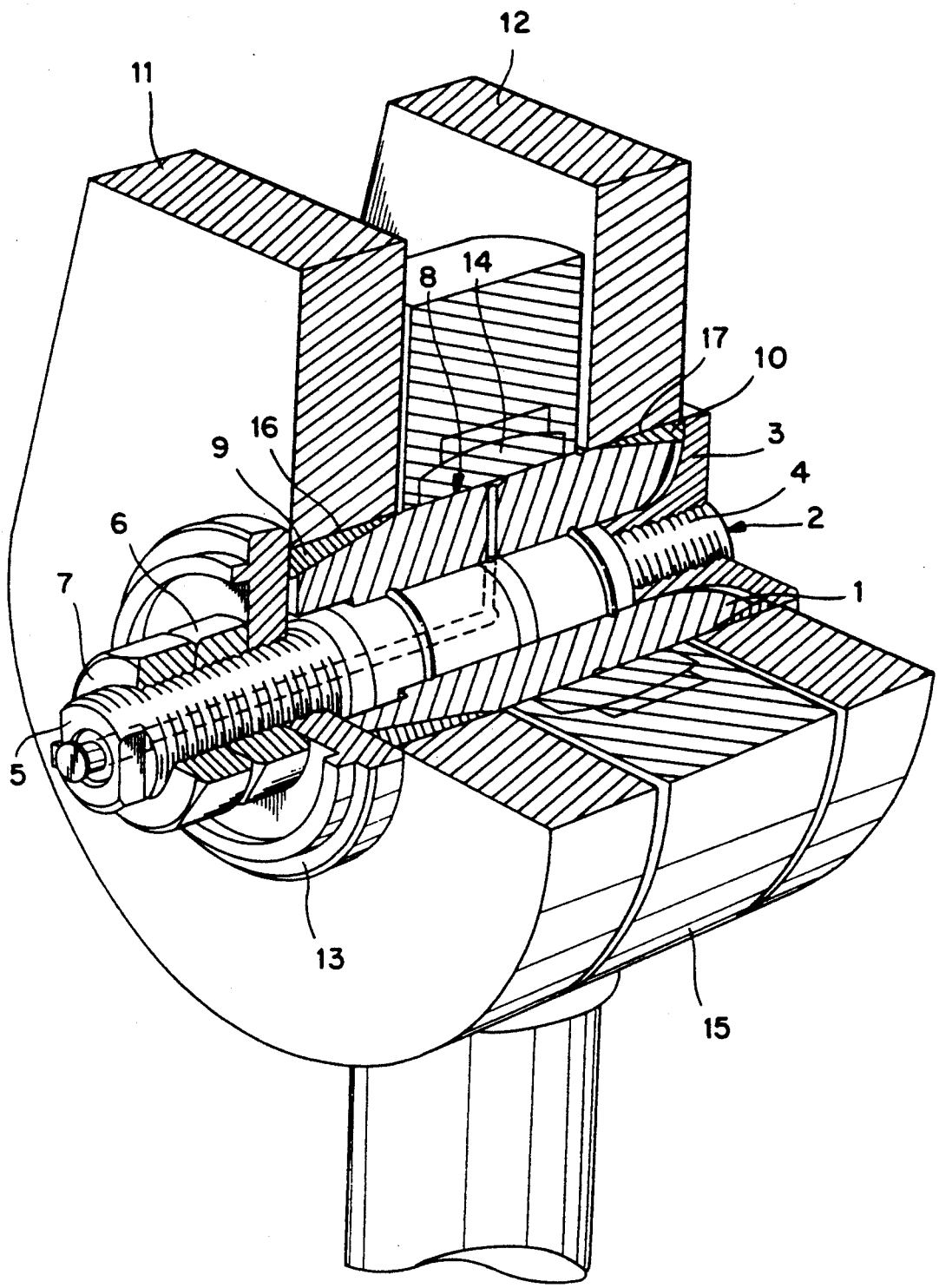

ARRANGEMENT FOR LOCKING A SHAFT TO A MACHINE MEMBER

The present invention relates to an arrangement for locking a shaft or an axle to a machine member, said shaft being intended to carry a bearing on a central cylindrical part thereof. The arrangement includes first and second expander sleeves which have conical internal form and each of which is located on a respective end of corresponding configuration on the shaft. The expander sleeves function as annular wedges with the apex of the wedge facing towards the cylindrical part of the shaft or axle and when tightened with the aid of tightening means can be caused to expand against the machine member and therewith lock the shaft thereto.

An arrangement of this kind intended for locking a shaft or an axle to the attachment lugs of a machine member is known from Swedish Published Specification 435 953.

One drawback with this known locking arrangement is that locking is effected through the medium of two nuts mounted on respective ends of the shaft and that when the shaft is located in a confined space, it is difficult to reach the nuts in order to tighten the same. Accordingly, it is an object of the present invention to provide an improved arrangement for locking a shaft or an axle to a machine member where solely one end of the shaft need be accessible in order to clamp or lock the shaft to said machine member.

The inventive arrangement is characterised in that the shaft comprises an outer sleeve, which presents the conically shaped end-parts, and a pin which is arranged coaxially with and within the sleeve and one end of which has an outwardly curved, mushroom-headed end-part pander sleeve, and the other end of which pin carries the fastener means with which the expander sleeves are caused to expand into clamping contact with the machine member.

The invention will now be described in more detail with reference to the accompanying drawing, the single Figure of which illustrates a preferred embodiment of the invention in perspective and partly in section.

The illustrated embodiment of the inventive arrangement includes an axle or shaft which comprises an outer sleeve 1 and a pin 2 which extends within the sleeve 1 coaxially therewith. Screwed onto one end of the pin 2 by means of screw threads 4 is a mushroom-headed end-part 3. The other end of the pin 2, the outer end 5, is screw-threaded and carries a tensioning nut 6 and a locking nut 7 which is located radially outwards of the nut 6. The sleeve 1 has a central cylindrical part 8 onto which the inner race or like bearing-part 14 of a bearing 15 to be mounted on the shaft can be press fitted. The illustrated embodiment of the inventive arrangement further includes two wedge-shaped expander sleeves 9 and 10 which are caused to expand into engagement with a respective attachment lug 11 and 12 on the machine member, by tightening the nut 6. Disposed between the expander sleeve 9 and the tensioning nut 6 is a turnable washer or plate 13 which has a smooth side facing towards the expander sleeve 9 in the manner illustrated.

The shaft is locked to the machine member in the following manner. The end-part 3 is screwed onto the pin 2, whereafter the expander sleeve 10 is fitted onto the sleeve 1 and the pin 2 is inserted through the axial bore of the sleeve 1. The expander sleeve 9 is then fitted onto the other end of the sleeve 1, whereafter the washer or plate 13 is fitted onto the pin 2 and the nut 6 is screwed onto the pin 2 and into abutment with the washer or plate 13. When tightening of the nut 6 is continued, the force generated thereby will cause the expander sleeves 9 and 10 to expand so as to be pressed into recesses 16 and 17 in respective lugs 11 and 12 and therewith lock the shaft to said lugs.

We claim:

1. An arrangement for locking a shaft or an axle to a machine member, said shaft being intended to carry a bearing on a central cylindrical part (8) thereof, said arrangement comprising first and second expander sleeves (9, 10) which have a conical internal form and each of which is intended to be mounted on a respective end of a corresponding configuration on the shaft, said expander sleeves (9, 10) functioning an annular wedges with the apex of the wedge facing towards the cylindrical part (8) of the shaft or axle and when tightened with the aid of fastener and tightening means (6) are caused to expand against the machine member and therewith lock the shaft thereto, and the shaft comprising an outer sleeve (1) which presents the conically shaped end-parts, and a pin (2) which is arranged coaxially with and within the outer sleeve (1) and one end of which has an outwardly curved, mushroom-headed end-part (3) having a radially extending inward surface that is intended to abut said second expander sleeve, and the other end (5) of which pin (2) carries the fastener means (6) with which the first and second expander sleeves (9, 10) are caused to expand into clamping contact width the machine member and said mushroom-headed end-part being dimensioned and arranged so as to facilitate the locking of the shaft to the machine member solely through manipulation of the fastener and tightening means positioned at one end of said pin.

2. An arrangement according to claim 1, further comprising a turnable washer or plate (13) positioned between said fastener and tightening means (6) and said first expander sleeve (9) and wherein said other end (5) of the pin (2) is screw-threaded and wherein said fastener and tightening means (6) includes a tensioning nut screwed onto said other end.

3. An arrangement according to claim 1, wherein the mushroom-headed end-part (3) is a separate part which is screwed (4) onto the pin (2).

4. An arrangement according to claim 2, further comprising a lock nut (7) which is screwed onto the pin (2) outwardly of the tensioning nut (6).

5. An arrangement according to claim 2, wherein the mushroom-headed end-part (3) is a separate part which is screwed (4) onto the pin (2).

6. An arrangement as recited in claim 1 wherein said mushroom-headed end-part has an exterior surface with a portion of said exterior surface defining the inward surface abutting said second expander sleeve, said exterior surface being concave in cross-section such that said mushroom-headed end-part includes an axially elongated portion and a radially extending end section.

7. An arrangement as recited in claim 6 wherein said outer sleeve includes a convex external end wall juxtaposed with respect to the exterior surface of said mushroom-headed end-part.

8. An arrangement as recited in claim 7 wherein the convex exterior end wall has a curvature corresponding with the curvature of the concave cross-sectioned exterior surface of said mushroom-headed end-part.

9. An arrangement as recited in claim 7 wherein the axially elongated portion of said mushroom-headed end-part has an inner end positioned axially inward of the external end wall of said outer sleeve and axially inward of said second expander sleeve.

10. An arrangement as recited in claim 1 wherein said outer sleeve includes an external end wall adjacent the inward surface of said mushroom-headed end-part, and said mushroom-headed end part including an axially elongated portion which has an inner end axially inward of the external end wall of said outer sleeve and axially inward of said second expander sleeve.

11. An arrangement as recited in claim 10 wherein said mushroom-headed end-part includes a head section extending radially outwardly from said axially elongated portion and having an axially inward wall surface of which a portion defines said inward surface abutting said second expander sleeve and said inward surface being axially external to said second expander sleeve and external to the machine member to which said outer sleeve is being fixed.

12. An arrangement as recited in claim 1 wherein said mushroom-headed end-part includes an exterior surface with a portion defining said inward surface in contact with said second expander sleeve, said exterior surface being concave in cross-section and having an axial portion extending inward of an external end of said outer sleeve and in contact with said outer sleeve such that said outer sleeve is adapted to ride upon the concave exterior surface and further force said expander sleeve against the machine member upon a tightening of said fastener ends.

13. An arrangement as recited in claim 1 further comprising a washer or plate positioned between the fastener means and having a peripheral edge extending radially outward to a greater extent than that of said fastener means and an axially interior surface in abutment with said first expander sleeve (9) and adjacent external end of said outer sleeve, and the axially interior surface of said washer or plate being planer in a radial direction.

* * * * *